(12) United States Patent
Temple, III (10) Patent No.: US 7,698,505 B2
(45) Date of Patent: Apr. 13, 2010

(54) METHOD, SYSTEM AND COMPUTER PROGRAM PRODUCT FOR DATA CACHING IN A DISTRIBUTED COHERENT CACHE SYSTEM

(75) Inventor: Joseph L. Temple, III, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/457,630

(22) Filed: Jul. 14, 2006

(65) Prior Publication Data

US 2008/0016286 A1    Jan. 17, 2008

(51) Int. Cl.
*G06F 12/00* (2006.01)

(52) U.S. Cl. .................. 711/133; 711/119; 711/122; 711/E12.023; 711/E12.024

(58) Field of Classification Search .................. None
See application file for complete search history.

(56) References Cited

U.S. PATENT DOCUMENTS

| | | | | |
|---|---|---|---|---|
| 5,829,025 | A | | 10/1998 | Mittal ........................ 711/122 |
| 5,829,029 | A | | 10/1998 | Shelly et al. ................ 711/133 |
| 5,850,179 | A | * | 12/1998 | Holmlund et al. ........... 340/518 |
| 6,115,804 | A | | 9/2000 | Carpenter et al. ............. 712/28 |
| 6,154,778 | A | * | 11/2000 | Koistinen et al. ........... 709/228 |
| 6,167,437 | A | | 12/2000 | Stevens et al. .............. 709/214 |
| 6,272,598 | B1 | * | 8/2001 | Arlitt et al. .................. 711/133 |
| 6,442,585 | B1 | * | 8/2002 | Dean et al. .................. 718/108 |
| 6,523,036 | B1 | | 2/2003 | Hickman et al. .............. 707/10 |
| 6,647,466 | B2 | | 11/2003 | Steely, Jr. ................... 711/138 |
| 2004/0133538 | A1 | | 7/2004 | Amiri et al. .................... 707/1 |
| 2005/0015661 | A1 | * | 1/2005 | Vaidyanathan ............... 714/13 |
| 2006/0174069 | A1 | * | 8/2006 | Shaw et al. ................. 711/146 |

OTHER PUBLICATIONS

Handy, Jim. The Cache Memory Book. C.A., Academic Press, Inc., 1998. p. 44. TK7895.M4H35.*

* cited by examiner

*Primary Examiner*—Reginald G Bragdon
*Assistant Examiner*—Larry T MacKall
(74) *Attorney, Agent, or Firm*—John Campbell; Kevin P. Radigan, Esq.; Heslin Rothenberg Farley & Mesiti P.C.

(57) ABSTRACT

A data caching approach is provided for a distributed computing environment employing coherent data caching. The data caching approach includes dynamically deciding whether to associate a priority tag with requested data for a processing unit, wherein the priority tag is to be employed in deciding whether to hold the requested data in a local cache associated with the processing unit. The dynamically deciding includes determining whether latency of arrival of requested data at the processing unit meets a set threshold, and if so, associating the priority tag with the requested data. The priority tag indicates that at least one of the requested data is to be captured in the local cache or the requested data is to be maintained in the local cache over other data without an associated priority tag. In one implementation, the threshold is a programmable threshold, and the local cache is a lookaside cache.

20 Claims, 6 Drawing Sheets fig. 1 fig. 2 fig. 3 fig. 4 fig. 4A fig. 5

METHOD, SYSTEM AND COMPUTER PROGRAM PRODUCT FOR DATA CACHING IN A DISTRIBUTED COHERENT CACHE SYSTEM

TECHNICAL FIELD

The present invention relates generally to caching of data in a computer system with distributed memory, and more particularly, to a dynamic data caching technique for a distributed coherent cache system of a distributed computing environment.

BACKGROUND OF THE INVENTION

Computing environments are often configured into computer systems with a relatively large, relatively slow main memory. Typically, multiple dynamic random access memory (DRAM) modules may comprise the memory system. This large memory system provides storage for a large number of instructions and/or a large amount of data for use by the processing units of the computing environment, and provides faster access to the instructions and/or data than may be achieved from disk storage, for example. However, the access times of modern DRAMs are significantly longer than the clock cycle length of modern processing units. The memory access time for a set of bytes being transferred to a processing unit may therefore be relatively long. Accordingly, the memory system is not a high bandwidth system, and the processing units may suffer performance due to a lack of available memory bandwidth. In order to allow high bandwidth memory access, and thereby increase the instruction execution efficiency (and ultimately processing unit performance), computer systems typically employ multiple caches, both processing unit external and internal, to store the most recently accessed data and instructions. A relatively small number of clock cycles is typically required to access data stored in a cache, as opposed to a relatively large number of clock cycles to access data in main memory.

Because the relative speed of memory is growing at a slower rate than processor speed, each successive computer system generation has a higher and higher dependency on the cache subsystem. Further, for certain workloads, large shared caches deliver better results than large private caches. For other workloads, private caches are preferred.

Previously, computer system designs have been optimized for either sharing or replication. Today's mainframe computing environments typically implement a shared L2 cache and arrange all the processors sharing it in a single multichip module package. This approach is expensive, but optimizes caching for multicontext workloads. As the mainframe computing environment attempts to move into different workloads, the shared cache provides less aggregate cache for very parallel workloads, notably industry standard benchmarks. Conversely, UNIX-based computer systems have typically implemented private caching. With a move into virtualization and workload management of multicontext workloads, the replication required of private caching disadvantageously reduces relative capacity and total cache capacity.

SUMMARY OF THE INVENTION

More particularly, technology is driving computer system hardware design towards distributed rather than centralized caches, but cache coherency designs require that data be deliverable from any processing unit and from any cache. Thus, the topology of a distributed cache requires data paths, but on the surface, favors treating the caches as private. The trade-offs between shared versus private caches are that each piece of data that is replicated in multiple caches represents a reduction in the total amount of data the aggregate cache can hold, and conversely, data maintained in private caches is closer to the associated processing unit, thus improving latency of delivery and also reducing the amount of traffic along the paths between caches, thereby avoiding delays. Thus, the balance is between maximizing the amount of data cached, and the latency to data already cached. One problem is that an optimum design point for a single-context workload is different from an optimum design point for a many-contexts workload. The optimum design point is also dependent upon the specific size and latencies in the various interconnection paths between the caches. The extent of interconnection can be quite complex, leading to a variety of latencies for different situations. As a result, it is difficult to determine the best solution for all environments and designers typically opt for the easiest solution, which is to keep the caches essentially private or at a low level of sharing.

In view of this, provided herein is an enhanced technique for sharing cache space among processing units based on a tunable latency parameter. For example, in one implementation the threshold can be set to zero, meaning that the requested data will always be replicated in the local cache, or can be set very high, meaning that the requested data will only be captured when received, for example, from a distant memory system.

More particularly, provided herein in one aspect is a computer-implemented method of data caching which includes: dynamically deciding whether to associate a priority tag with requested data for a processing unit of a distributed computing environment comprising a distributed coherent cache system, the priority tag being employed in deciding whether to maintain the requested data in a local cache associated with the processing unit; and wherein the dynamically deciding includes determining whether latency of arrival of the requested data at the processing unit meets a defined threshold, and if so, associating the priority tag with the requested data, the priority tag indicating that at least one of the requested data is to be captured in the local cache and the requested data is to be maintained in the local cache over other data without an associated priority tag.

In another aspect, a distributed computing environment is provided which includes multiple processing units and a distributed coherent cache system. At least one processing unit has associated therewith a local lookaside cache. The at least one processing unit includes logic to dynamically decide whether to associate a priority tag with requested data. The priority tag is employed in deciding whether to hold the requested data in the local lookaside cache of the at least one processing unit. This dynamically deciding includes determining whether latency of arrival of the requested data at the processing unit meets a set threshold, and if so, associating the priority tag with the requested data. The priority tag indicates that at least one of the requested data is to be captured in the local lookaside cache or the requested data is to be maintained in the local lookaside cache over other data without an associated priority tag.

In a further aspect, a computer program product is provided comprising a computer usable medium including a computer readable program. The computer readable program when executed on a computer causes the computer to perform a method of data caching. The method includes: dynamically deciding whether to associate a priority tag with requested data for a processing unit of a distributed computing environment comprising a distributed coherent cache system, the priority tag being employed in deciding whether to hold the requested data in a local cache associated with the processing unit; and wherein the dynamically deciding includes determining whether latency of arrival of the requested data at the processing unit meets a set threshold, and if so, associating the priority tag with the requested data, the priority tag indicating that at least one of the requested data is to be captured in the local cache or the requested data is to be maintained in the local cache over other data without an associated priority tag.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, disclosed herein is a dynamic technique for data caching wherein a priority tag is automatically selectively associated with requested data by a processing unit of a distributed computing environment employing a distributed coherent cache system. The dynamic association includes determining whether latency of arrival of the requested data at the processing unit meets a set threshold, and if so, associating the priority tag with the requested data. The priority tag indicates that the requested data is to be captured in a local cache of the processing unit and/or is to be maintained in the local cache over other data without an associated priority tag.

In one implementation, the local cache is a lookaside cache of the processing unit and the set threshold is a programmable threshold which can be adjusted for each implementing processing unit of the distributed computing environment. Through programming of the set threshold, the replication or local capture of data is adjusted based on the latency of arrival of the requested data at the processing unit. Thus, if the latency is "acceptable" the data may not replicated (i.e., captured), and the cache space otherwise used is saved for other data that has an unacceptable latency of arrival at the processing unit. Note that the latency of arrival refers to a combination of physical distance and network congestion/data contention. For example, there may be a contention situation where delay in the requested data arrival from a relatively close cache of another processing unit may be similar to an uncontended delay of data from a more physically distant cache or main memory. As a further enhancement, data might be overwritten in the lookaside cache only if the latency of the recently received requested data exceeds the latency of the data already in the cache that is to be overwritten. For example, timestamps could be employed to implement this concept.

Figure 1:
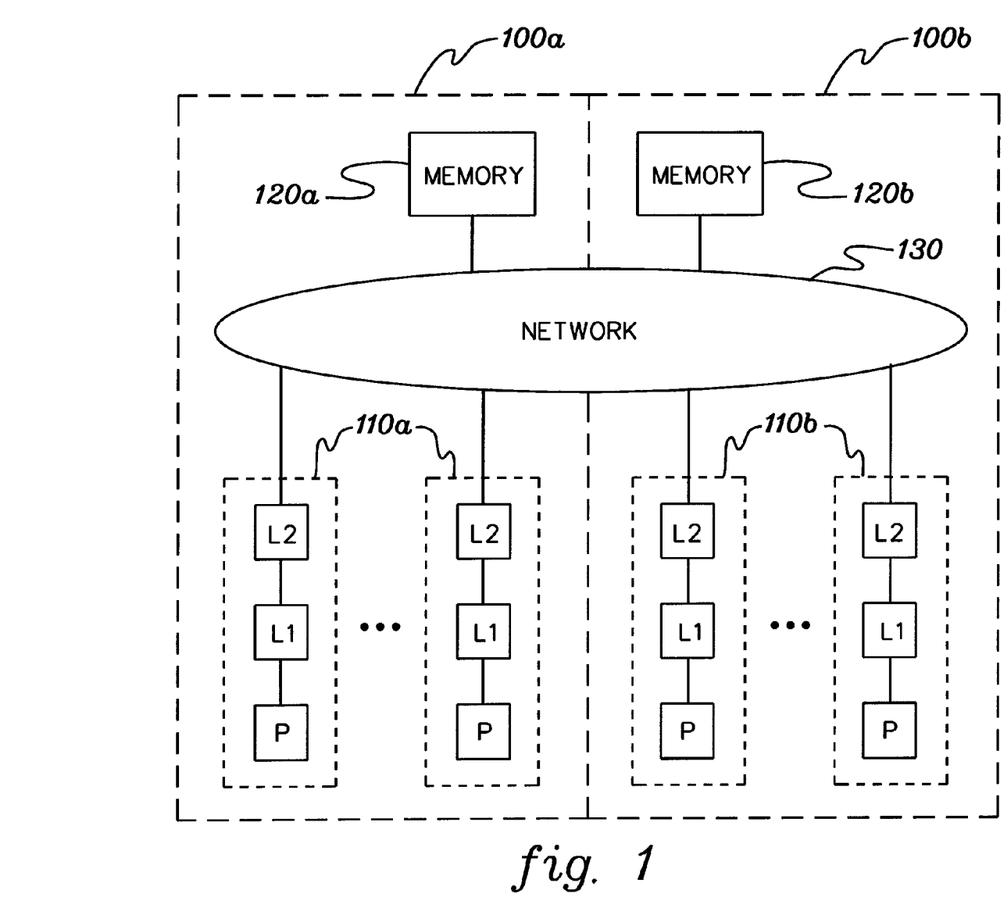
FIG. 1 depicts one example of a conventional distributed computing environment comprising multiple computer systems employing a distributed coherent cache system wherein multiple processing units of the systems each include an in-line private cache hierarchy.
Figure 2:
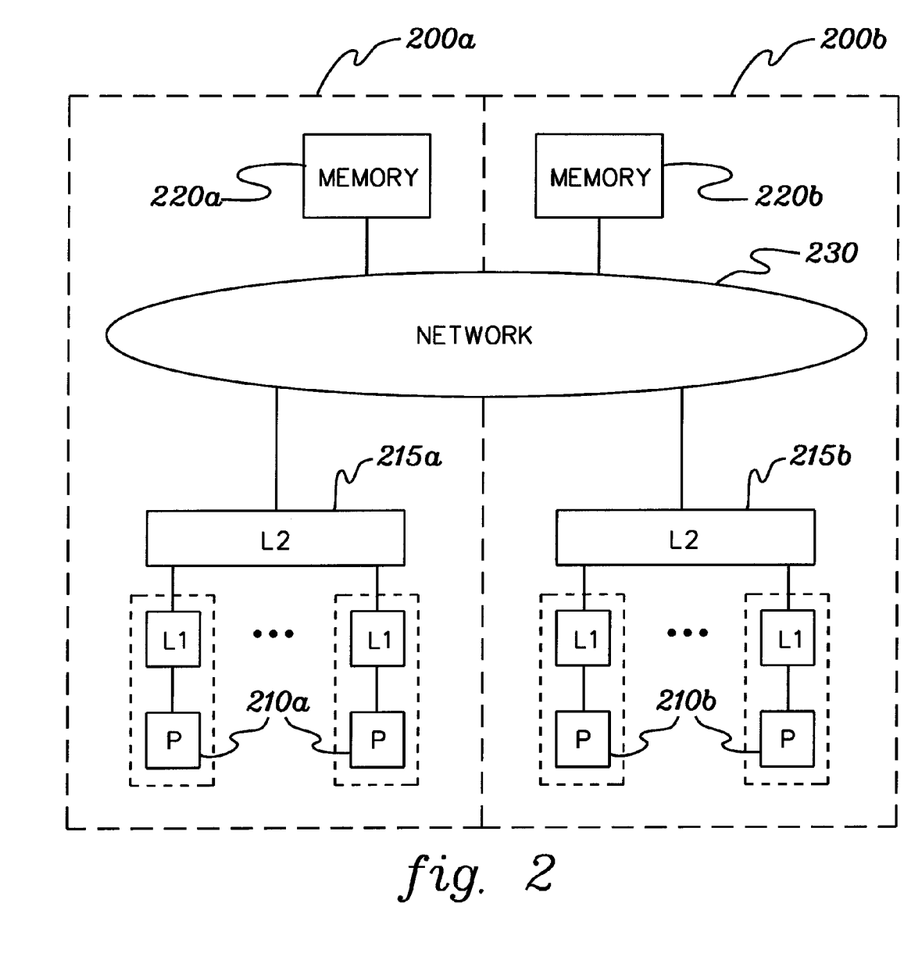
FIG. 2 depicts one embodiment of a conventional distributed computing environment comprising multiple computer systems employing a distributed coherent cache system, wherein L2 caches are shared within each computer system among multiple processing units.

FIGS. 1 & 2 depict exemplary embodiments of distributed computing environments wherein private caches and shared caches are respectively employed by processing units. Referring first to FIG. 1, the distributed computing environment includes multiple computer systems 100a, 100b employing a distributed coherent cache system, meaning that each processing unit 110a, 110b has access to each memory system 120a, 120b via a network 130 interconnecting the computer systems 100a, 100b. In this example, each processing unit 110a, 110b includes a processor P, a level 1 (L1) cache, and a level 2 (L2) cache. Each L1 cache, L2 cache pair is an in-line private cache hierarchy for the respective processing unit. Since the distributed computing environment employs a distributed coherent cache system, each L2 cache of each processing unit is accessible by each other processing unit. If there are n L2 caches, a cache line held in all L2 caches takes up n lines of aggregate space. The L2 cache latency is short between an associated L2 cache and L1 cache pair, but potentially long between one L2 cache and another L2 cache of different processing units 110a, 110b on different computer systems 100a, 100b.

By way of example, the distributed computing environment of FIG. 1 is based on the z/Architecture offered by International Business Machines Corporation, Armonk, N.Y., USA. The z/Architecture is described in an IBM® publication entitled, "z/Architecture Principles of Operation," IBM Publication No. SA22-7832-04, Fifth Edition (September 2005), which is hereby incorporated herein by reference in its entirety. (IBM® is a registered trademark of International Business Machines Corporation, Armonk, N.Y., USA. Other names used herein may be registered trademarks, trade names or product names of International Business Machines Corporation or other companies.) In one example, a computer system based on the z/Architecture includes multiple eServer zSeries processing units 110a, 110b, offered by International Business Machines Corporation, Armonk, N.Y., USA. The processing units are coupled together via network 130, which may comprise any large commercially available bus or crosspoint switch which allows each processing unit to access the memory and caches of the distributed computing environment. In other embodiments, network 130 could comprise any type of connection, such as a token ring or a TCP/IP connection, to name just a few examples. Memory 120a, 120b may comprise any memory system including, for example, dynamic random access memory (DRAM) modules.

Note that the above-referenced computing environment is described by way of example only. One or more aspects of the present invention described herein may be incorporated and used with other types of computer systems, processing units, networks and memory systems, without departing from the spirit of the present invention.

FIG. 2 depicts a variation on the distributed computing environment of FIG. 1 wherein level 2 (L2) caches 215a, 215b are each respectively shared by multiple processing units 210a, 210b. The computer systems 200a, 200b again include memory 220a, 220b and an interconnection network 230 coupling the processing units 210a, 210b and memory 220a, 220b. Each processing unit 210a, 210b includes a processor P and a level 1 (L1) cache, in addition to the shared L2 cache 215a, 215b. It is again assumed that the distributed computing environment implements a distributed coherent cache system wherein any processing unit 210a, 210b can access cached data in any L2 cache 215a, 215b. Network 230 can comprise, for example, a bus or crosspoint switch which allows access of each processor P to the L2 caches and memory of the computer systems 200a, 200b.

Note that in the shared L2 cache embodiment of FIG. 2, each cache line held in the L2 caches consumes only one line of aggregate space. The latency of arrival for data from the shared L2 cache is longer than in the private L2 cache embodiment of FIG. 1 due to the sharing and the size of the L2 cache, but not as long as the latency of arrival of an L2 cache to L2 cache transfer (either between the shared L2 caches of the distributed computing environment of FIG. 2, or the private L2 caches in the distributed computing environment of FIG. 1).

Further note that in conventional distributed computing environments employing the configuration of FIG. 1, the L2 caches for (for example) UNIX computer systems run at about 8 MB per private L2 cache. This results in an effective aggregate cache size of between 8 MB and n×8 bytes, depending upon the amount of sharing between processing units. Employing the distributed computing environment configuration of FIG. 2, the shared L2 cache typically runs at 39 MB per computer system, and contains four computer systems.

Figure 3:
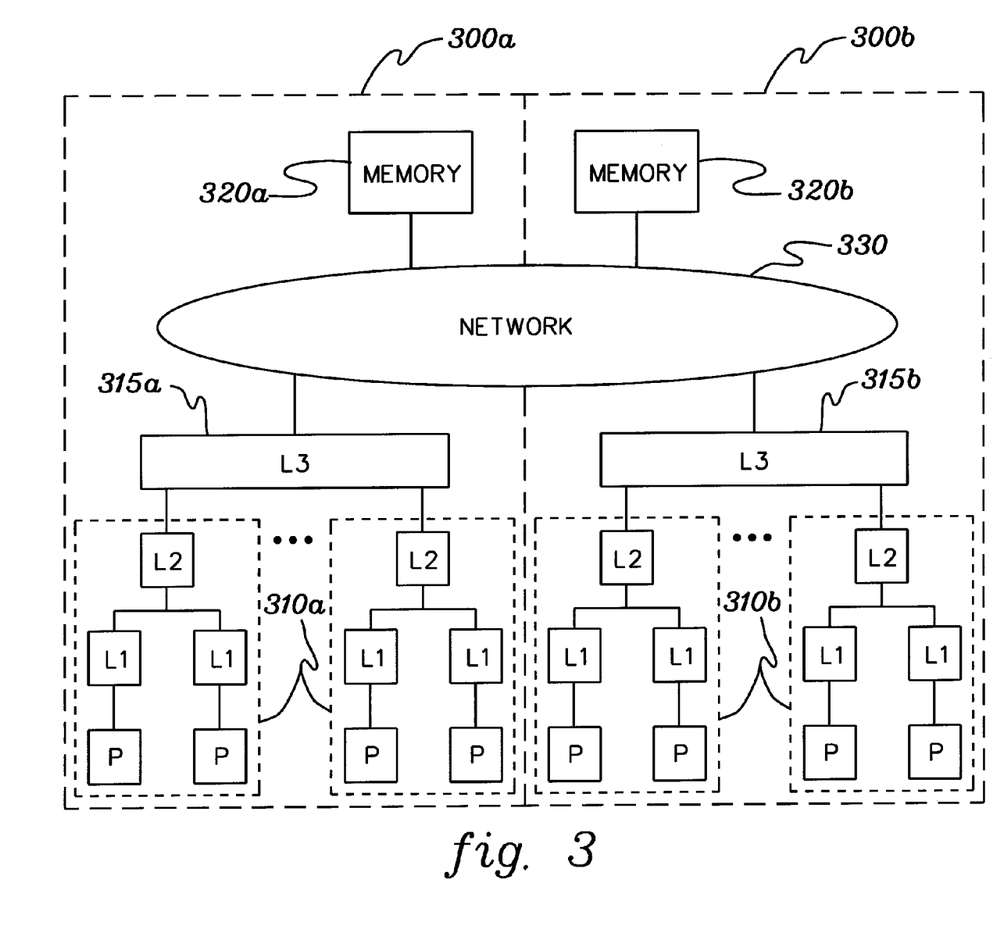
FIG. 3 depicts one embodiment of a distributed computing environment comprising multiple computer systems employing a distributed coherent cache system, wherein within each computer system L3 caches are shared among multiple multi-processor processing units, and wherein data caching is to be employed, in accordance with an aspect of the present invention.

FIG. 3 depicts an alternate implementation of a distributed computing environment, again employing a distributed coherent cache system. In this computing environment multiple computer systems 300a, 300b are interconnected via a network 130 so that each multi-processor processing unit 310a, 310b has access via a shared level 3 (L3) cache 315a, 315b to memory 320a, 320b. Further, each processor P has access to data in each shared L3 cache 315a, 315b. In the embodiment shown, each multi-processor processing unit 310a, 310b includes multiple processors P, each having an associated level 1 (L1) cache and a shared level 2 (L2) cache. The shared L3 caches 315a, 315b are shared by the multiple multi-processor processing units 310a, 310b, respectively, in a given computer system, 300a, 300b. In one example, each multi-processor processing unit 310a, 310b is an integrated circuit chip, and each shared L3 cache 315a, 315b is an external cache within the package defining the respective computer systems 300a, 300b (e.g., with a module, board, card, blade etc). Although a shared L3 cache provides enhanced caching of data, ever-fast cycle times are causing a need to localize the L3 cache to the multi-processor processing unit boundaries (i.e., on chip), due to the expense of sharing the L3 caches at higher cycle rates.

Figure 4:
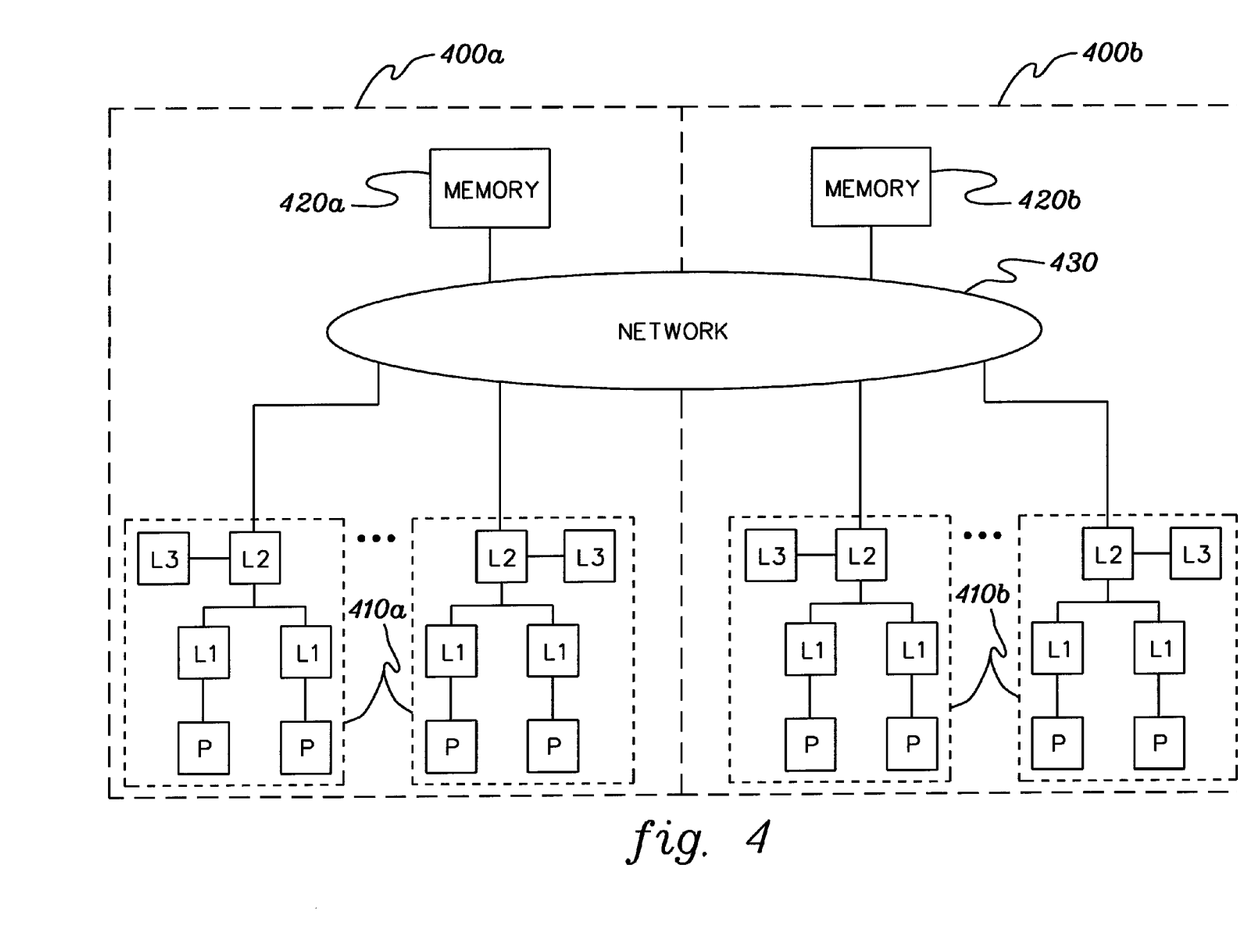
FIG. 4 depicts one embodiment of a distributed computing environment comprising multiple computer system employing a distributed coherent cache system, wherein each multi-processor processing unit employs private L1 caches, a shared L2 cache and a shared L3 lookaside cache, and wherein data caching is to be employed, in accordance with an aspect of the present invention.

FIG. 4 depicts an alternate implementation of a distributed computing environment wherein multiple computer systems 400a, 400b again include multiple multi-processor processing units 410a, 410b interconnected via a network 430 with memory 420a, 420b. Each multi-processor processing unit 410a, 410b includes, in this embodiment, multiple processors P, each having an associated private level 1 (L1) cache, connected to a shared level 2 (L2) cache. Further, a level 3 (L3) cache is provided as a lookaside cache to the shared L2 cache. Employing network 430 and conventional snooping protocol, each processor P has access to data cached in the L2 caches distributed throughout the computing environment, as well as the lookaside L3 caches and memory 420a, 420b.

Figure 4A:
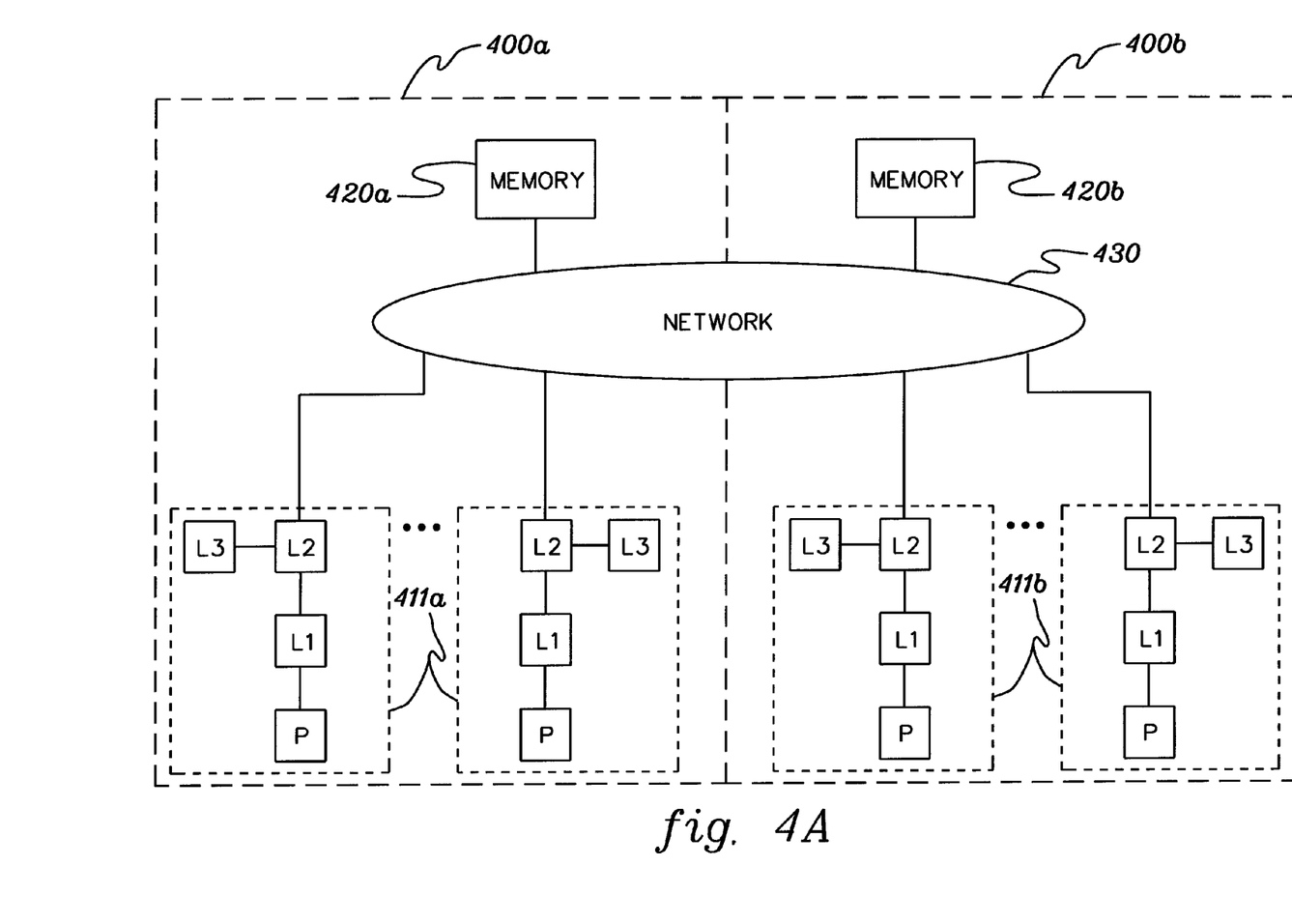
FIG. 4A depicts another embodiment of a distributed computing environment comprising multiple computer systems employing a distributed coherent cache system, wherein each processing unit employs a private L1 cache, a private L2 cache, and an L3 lookaside cache, wherein data caching is to be employed, in accordance with an aspect of the present invention.

FIG. 4A depicts a variation on the distributed computing environment of FIG. 4 wherein each processing unit 411a, 411b comprises a single processor P core having an in-line private level 1 (L1) cache, private level 2 (L2) cache and lookaside level 3 (L3) cache. In this implementation, each processor again has access to data cached in any L2 cache or L3 cache of the distributed computing environment, as well as any memory 420a, 420b employing the network interconnections 430 and conventional snooping protocol.

An object of the concepts presented herein is to obtain the most mainframe-like behavior from a distributed L3 cache implementation such as presented in FIGS. 4 & 4A. Mainframe computer systems have traditionally been able to schedule off a common queue. This provides the best queuing theory system performance, but requires scheduling without "affinity" of work to particular processors. As cycle times increase, mainframe designers are forced into more distributed L3 cache designs to maintain low latency of data delivery. UNIX-based machines have "processor affinity" built into their schedulers. Such machines do not optimize queue behavior, which shows up as lower utilization rates. Further, these machines suffer when there is a significant amount of data sharing which causes cache replication or migration. As UNIX-based machines move towards virtualization and mixed workload management, the machines need to perform more like traditional mainframe implementations.

Provided herein therefore is a dynamic control of replication/sharing technique wherein cache behavior is optimized to a particular executing workload. Because cache coherency is assumed, snooping is employed to locate requested data within, for example, an L3 cache of any processing unit in the distributed computing environment. Typically, delivery of requested data from another processing unit's L3 cache is faster than if the data were to be retrieved from memory of the computing environment. Thus, pursuant to an aspect of the present invention, if data can be retrieved from another processor's local cache (such as an L2 or an L3 cache) quick enough, then an L3 lookaside cache copy of the data at the requesting processing unit will not be maintained. Pursuant to the present invention, a programmable, set threshold is employed to control replication or local capture of the requested data based on the latency of arrival of the data at the requesting processing unit. Thus, if the latency is "acceptable", the requested data is not replicated into the unit's L3 lookaside cache, and the cache line otherwise consumed by the data is saved for other data that has, for example, a longer latency of arrival at the requesting processing unit.

Figure 5:
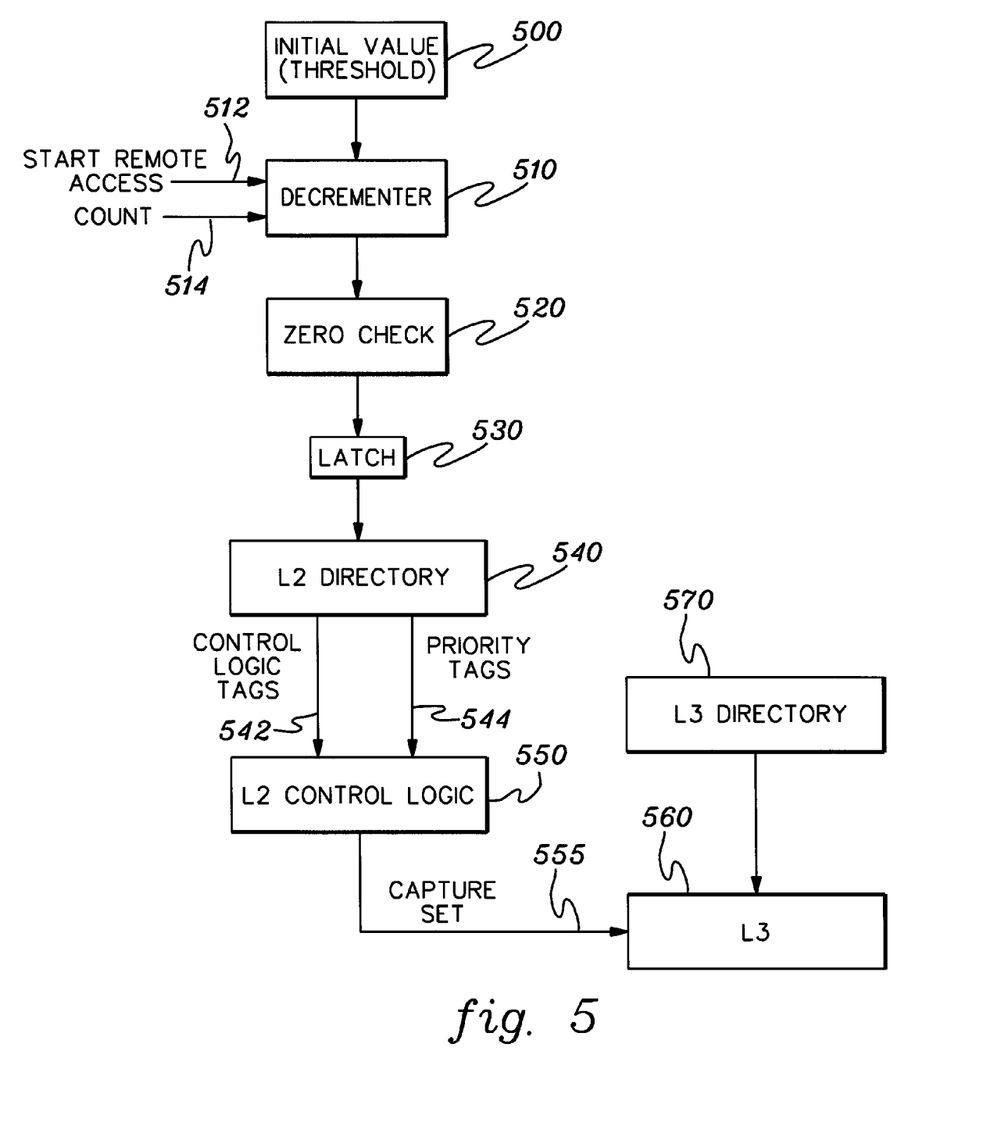
FIG. 5 depicts one embodiment of logic for dynamically deciding whether to associate a priority tag with requested data of an L2 cache for selective capturing of the data into an L3 lookaside cache, in accordance with an aspect of the present invention.

FIG. 5 depicts one embodiment of logic for implementing a latency of arrival determination. An initial threshold value 500 is loaded from a programmable, initial value register into a decrementer 510, which is initiated whenever a start remote access signal 512 is received. This start remote access signal is readily generated whenever a processor searches outside its processing unit for the requested data, that is, whenever the processor is unable to locate the data in its own L1 cache, L2 cache or L3 cache. Processor cycles are counted 514 by the decrementer 510 and zero check logic 520 detects when the decrementer reaches zero. Responsive to the decrementer counting down to zero, a latch 530 is set which signals the L2 directory 540 of the requesting processor that the latency of arrival of the requested data has exceeded the set threshold. The L2 directory, in addition to providing control logic tags 542 to L2 control logic 550, also assigns a priority tag 544 to any requested data having latency of arrival greater than the set threshold. The L2 control logic 550 then forces the capture of the requested data from, e.g., the L2 cache into the L3 lookaside cache whenever the particular requested data is to be overwritten, for example, in accordance with a least recently used protocol. L3 cache 560 has its own L3 directory 570, which holds the timestamps (if employed) of the data held in the L3 cache.

To restate, operationally, a processor P within one of the processing units requests data that is not in its local caches (that is, its L1, L2 or L3 caches). The cache/memory controller for the particular processing unit initiates a remote data access which sets, for example, a decrementer to an initial adjustable threshold. (Alternatively, an incrementer could be employed with the logic counting from zero to some set threshold.) As the remote access proceeds, the decrementer counts down with each processor cycle to track the latency of arrival of the requested data at the processing unit. The zero check logic, which could comprise a comparator, triggers a signal to the latch once the threshold latency has been reached. As a further variation, the decrementer (or incrementer) could continue to count to track the actual latency of arrival of the requested data, even after the latency exceeds the set threshold, with the value of the latency being maintained by the L2 directory for use by the L2 control logic in deciding whether to hold the requested data, i.e., if holding of data is to be further qualified with the actual latency of arrival (e.g., in a situation where more data requests exceed the set threshold than can be accommodated in the lookaside L3 cache).

Data in the L3 cache displaced by the new requested data is simply overwritten if that data lacks a priority tag, that is, assuming that all data overwritten from the L2 cache is initially captured into the L3 lookaside cache, or is the least recently used data in the L3 cache, that is, if all data in the L3 cache have priority tags associated therewith.

As a variation, capture of the requested data into the L3 lookaside cache could be accomplished "on arrival" at the processing unit. This could be implemented as follows:

If the least recently used data cache line in the lookaside cache has a latency under the set threshold, that data is overwritten by the newly requested data irrespective of whether the newly requested data has a priority tag associated therewith.

If the least recently used data cache line has a latency over the set threshold, meaning that a priority tag is associated therewith, the newly requested data arriving under the set threshold replaces a more recently used data cache line in the L3 lookaside cache.

If the least recently used data cache line has an associated priority tag, and the recently received data is less than the set threshold, the recently received data is not captured into the L3 lookaside cache.

Note that the above-attained process requires that the priority tag remain associated with the captured data in the lookaside cache. This can be accomplished by associating a bit with the captured data. If the priority tag is active when the requested data arrives, then the data is captured into the L3 lookaside cache, otherwise, it is not. The initial value or threshold value for the threshold register 500 (FIG. 5) can be programmable either at initialization or as a control register. This allows tuning of the threshold for particular processing units to optimize the behavior of the cache of each processing unit dependent upon the workload of the computing environment.

As a further variation, logic can be provided to determine if requested data arrives from another (probably within the same computer system) L2 cache, before data from a local L3 cache arrives. If so, then the local L3 cache data line is marked as "under threshold" or simply invalidated.

Note that there is another type of tag used in certain distributed cache approaches called the "local change bit". Where this bit is used, the local L3 lookaside cache would capture the data, regardless of the presence of a priority tag.

Further, since sharing increases the number of remote accesses to caches, it is advantageous to put data that is shared into the L3 lookaside cache before it is aged out of the L2 cache. This can be done in one of two ways. First, data can be placed into the L3 cache directly on access whenever the set threshold is met, or data can be moved into the L3 lookaside cache the first time that it is remotely accessed.

Because of invalidations, there can be cache lines available within the L3 lookaside cache. Data can be allowed to be replicated into the L3 cache even if it doesn't have associated therewith the priority tag. In such a case, the priority tag is also maintained in the L3 directory. Lines held in these invalidated slots without the priority tag being set would be replaced before those saved with an associated priority tag, regardless of age.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples. Many changes, additions or deletions may be made without departing from the spirit of the present invention. For example, the processing units may be other than servers and/or other than IBM® servers. There may be additional nodes, interfaces, interconnects and/or fabrics. Many other changes, additions, deletions may be made without departing from the spirit of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of data caching comprising:
    dynamically deciding whether to associate a priority tag with requested data for a processing unit of a distributed computing environment comprising a distributed coherent hardware cache system, the priority tag being employed in deciding whether to hold the requested data in a local hardware cache associated with the processing unit and comprising part of the distributed coherent hardware cache system; and
    wherein the dynamically deciding includes determining whether a latency of arrival value of the requested data at the processing unit meets a set, programmable latency threshold for the processing unit, the programmable latency threshold being tuned for the processing unit based on a type of workload being processed by the processing unit, and if so, associating the priority tag with the requested data, capturing the requested data and the latency of arrival value in the local cache, and conditionally maintaining the requested data with the associated priority tag in the local cache based on the priority tag being associated therewith over other data in the local cache without an associated priority tag, and if there is no other data in the local cache without an associated priority tag, then conditionally maintaining the requested data in the local cache if the latency of arrival value of the requested data is larger than a latency of arrival value of other data in the local cache with a priority tag associated therewith.

2. The computer-implemented method of claim 1, wherein the set threshold is a programmable, preset threshold, and the local cache is a lookaside cache associated with the processing unit.

3. The computer-implemented method of claim 1, wherein the distributed computing environment comprises multiple processing units, and wherein the set, programmable latency threshold is a different value for at least some processing units of the multiple processing units of the distributed computing environment, the set threshold being differently programmed for the at least some processing units based on a different workload type being processed by each processing unit of the at least some processing units.

4. The computer-implemented method of claim 1, wherein the determining further comprises setting a decrementer value equal to the set threshold with initiation by the processing unit of a remote access for the requested data, and thereafter decrementing the decrementer value with subsequent processing cycles to track the latency of arrival of the requested data at the processing unit, and associating the priority tag with the requested data responsive to the decrementer reaching zero prior to receipt of the requested data at the processing unit.

5. The computer-implemented method of claim 4, wherein the processing unit further comprises a private cache hierarchy comprising a level 1 (L1) cache, a level 2 (L2) cache and a level (L3) cache, the local cache comprising the L3 cache, the L3 cache being a lookaside cache, and wherein the priority tag, if associated with the requested data, indicates that the requested data is to be captured into in the L3 lookaside cache from the L2 cache, and if not associated with the requested data, indicates that the requested data is not to be captured into the L3 lookaside cache from the L2 cache.

6. The computer-implemented method of claim 1, wherein the processing unit is one processing unit of multiple processing units of the distributed computing environment, and wherein the requested data originates remotely from the processing unit and arrives at the processing unit with a latency of arrival value dependent in part on topology of the distributed computing environment and in part on network congestion and data contention within the distributed computing environment, and wherein the dynamically deciding inherently compensates for variations in network congestion and data contention in relating latency of arrival of the requested data at the processing unit with the set threshold.

7. The computer-implemented method of claim 1, wherein the local cache comprises multiple cache lines, and wherein the requested data is captured into at least one cache line of the multiple cache lines of the local cache responsive to the priority tag being associated therewith, and wherein when the local cache is already full, the requested data is written into a cache line comprising one of data without an associated priority tag or least recently used data with an associated priority tag and a smaller latency of arrival value.

8. A distributed computing environment comprising:
    multiple processing units and a distributed coherent hardware cache system employed by the multiple processing units, at least one processing unit of the multiple processing units having associated therewith a local hardware lookaside cache which is part of the distributed coherent hardware cache system; and
    wherein the at least one processing unit comprises logic to dynamically decide whether to associate a priority tag with requested data, the priority tag being employed in deciding whether to hold the requested data in the local lookaside cache, the logic including logic to determine whether a latency of arrival value of the requested data at the at least one processing unit meets a set, programmable latency threshold for the processing unit, the programmable latency threshold being tuned for the processing unit based on a type of workload being processed by the processing unit, and if so, to associate the priority tag with the requested data, to capture the requested data and the latency of arrival value in the local hardware lookaside cache, and to conditionally maintain the requested data with the associated priority tag in the local hardware lookaside cache based on the priority tag being associated therewith over other data in the local hardware lookaside cache without an associated priority tag, and if there is no other data in the local hardware lookaside cache without an associated priority tag, then to conditionally maintain the data in the local hardware lookaside cache if the latency of arrival value of the requested data is larger than a latency of arrival value of other data in the local hardware lookaside cache with a priority tag associated therewith.

9. The distributed computing environment of claim 8, wherein the set threshold is a programmable, preset threshold, and the local lookaside cache is a level 3 (L3) lookaside cache associated with the at least one processing unit.

10. The distributed computing environment of claim 8, wherein the set, programmable latency threshold is a different value for at least some processing units of the multiple processing units of the distributed computing environment, the set threshold being differently programmed for the at least some processing units based on a different workload type being processed by each processing unit of the at least some processing units.

11. The distributed computing environment of claim 8, wherein the logic to dynamically decide further comprises a decrementer and logic to set a decrementer value equal to the set threshold with initiation of a remote access for the requested data by the at least one processing unit, and thereafter to decrement the decrementer value with subsequent processing cycles to track the latency of arrival of the requested data at the at least one processing unit, and to associate the priority tag with the requested data responsive to the decrementer reaching zero prior to receipt of the requested data at the at least one processing unit.

12. The distributed computing environment of claim 11, wherein the at least one processing unit further comprises a private cache hierarchy comprising a level 1 (L1) cache, a level 2 (L2) cache and a level 3 (L3) cache, the L3 cache being the local lookaside cache, and wherein the priority tag, if associated with the requested data, indicates that the requested data is to be captured into the L3 lookaside cache from the L2 cache, and if not associated with the requested data, indicates that the requested data is not to be captured into the L3 lookaside cache from the L2 cache.

13. The distributed computing environment of claim 12, wherein the at least one processing unit comprises multiple processors, and the private cache hierarchy comprises a private L1 cache for each processor of the multiple processors, an L2 cache shared by the multiple processors, and an L3 lookaside cache shared by the multiple processors.

14. The distributed computing environment of claim 8, wherein the requested data originates remotely from the at least one processing unit and arrives at the at least one processing unit with a latency of arrival value dependent in part on topology of the distributed computing environment and in part on network congestion and data contention within the distributed computing environment, and wherein the logic to dynamically decide inherently compensates for variations in network congestion and data contention in relating latency of arrival of the requested data at the at least one processing unit with the set threshold.

15. The distributed computing environment of claim 8, wherein the local lookaside cache comprises multiple cache lines, and wherein the at least one processing unit is adapted to capture the requested data into at least one cache line of the multiple cache lines of the local lookaside cache responsive to the priority tag being associated therewith, and wherein when the local lookaside cache is already full, the requested data is captured into a cache line comprising data without a priority tag or into a cache line comprising least recently used data with a priority tag and a smaller latency of arrival value.

16. A computer program product comprising a storage medium readable by a processing circuit and storing instructions for the execution by the processing circuit for performing a method of data caching, the method comprising:
dynamically deciding whether to associate a priority tag with requested data for a processing unit of a distributed computing environment comprising a distributed coherent hardware cache system, the priority tag being employed in deciding whether to hold the requested data in a local hardware cache associated with the processing unit and comprising part of the distributed coherent hardware cache system; and
wherein the dynamically deciding includes determining whether a latency of arrival value of the requested data at the processing unit meets a set, programmable latency threshold for the processing unit, the programmable latency threshold being tuned for the processing unit based on a type of workload being processed by the processing unit, and if so, associating the priority tag with the requested data, capturing the requested data and the latency of arrival value in the local cache, and conditionally maintaining the requested data with the associated priority tag in the local cache based on the priority tag being associated therewith over other data in the local cache without an associated priority tag, and if there is no other data in the local cache without an associated priority tag, then conditionally maintaining the requested data in the local cache if the latency of arrival value of the requested data is larger than a latency of arrival value of other data in the local cache with a priority tag associated therewith.

17. The computer program product of claim 16, wherein the set threshold is a programmable, preset threshold, and the local cache is a lookaside cache associated with the processing unit.

18. The computer program product of claim 16, wherein the distributed computing environment comprises multiple processing units, and wherein the set, programmable latency threshold is a different value for at least some processing units of the multiple processing units of the distributed computing environment, the set threshold being differently programmed for the at least some processing units based on a different workload type being processed by each processing unit of the at least some processing units.

19. The computer program product of claim 16, wherein the processing unit further comprises a private cache hierarchy comprising a level 1 (L1) cache, a level 2 (L2) and a level 3 (L3) cache, the local cache comprising the L3 cache, the L3 cache being a lookaside cache, and wherein the priority tag, if associated with the requested data, indicates that the requested data is to be captured into the L3 lookaside cache from the L2 cache, and if not associated with the requested data, indicates that the requested data is not to be captured into the L3 lookaside cache from the L2 cache.

20. The computer program product of claim 16, wherein the processing unit is one processing unit of multiple processing units of the distributed computing environment, and wherein the requested data originates remotely from the processing unit and arrives at the processing unit with a latency of arrival value dependent in part on topology of the distributed computing environment and in part on network congestion and data contention within the distributed computing environment, and wherein the dynamically deciding inherently compensates for variations in network congestion and data contention in relating latency of arrival of the requested data at the processing unit with the set threshold.

* * * * *